United States Patent
Hao et al.

(10) Patent No.: US 7,702,190 B2
(45) Date of Patent: Apr. 20, 2010

(54) FIBER BRAGG GRATING SENSOR

(75) Inventors: Jianzhong Hao, Singapore (SG); Jun Hong Ng, Singapore (SG); Shiro Takahasi, Ibaraki (JP)

(73) Assignee: Agency for Science, Technology and Research, Singapore (SG)

( * ) Notice: Subject to any disclaimer, the term of this patent is extended or adjusted under 35 U.S.C. 154(b) by 0 days.

(21) Appl. No.: 11/887,846

(22) PCT Filed: Apr. 5, 2006

(86) PCT No.: PCT/SG2006/000086

§ 371 (c)(1),
(2), (4) Date: Jan. 13, 2009

(87) PCT Pub. No.: WO2006/107278

PCT Pub. Date: Oct. 12, 2006

(65) Prior Publication Data

US 2009/0129722 A1    May 21, 2009

(51) Int. Cl.
G02B 6/00 (2006.01)
G02F 1/295 (2006.01)

(52) U.S. Cl. .................. 385/13; 385/12; 385/10

(58) Field of Classification Search ............ 385/12, 385/13, 10
See application file for complete search history.

(56) References Cited

U.S. PATENT DOCUMENTS

| | | | |
|---|---|---|---|
| 5,682,445 A | 10/1997 | Smith | |
| 6,471,710 B1 * | 10/2002 | Bucholtz | 606/130 |
| 6,563,969 B2 * | 5/2003 | Ames | 385/12 |
| 2005/0232532 A1 * | 10/2005 | Wang et al. | 385/13 |
| 2006/0045408 A1 * | 3/2006 | Jones et al. | 385/12 |

FOREIGN PATENT DOCUMENTS

| | | |
|---|---|---|
| JP | 2004361323 | 12/2004 |
| WO | 03/001262 | 1/2003 |

(Continued)

OTHER PUBLICATIONS

Sung Chul Kang et al., "Temperature-independent strain sensor system using a tilted fiber Bragg grating demodulator," IEEE Photon. Technol. Lett., vol. 10, No. 1 10, pp. 1461-1463, Oct. 1998.

(Continued)

Primary Examiner—Frank G Font
Assistant Examiner—Robert Tavlykaev
(74) Attorney, Agent, or Firm—Mitchell P. Brook; Luce, Forward, Hamilton & Scripps LLP

(57) ABSTRACT

An optical fiber strain sensor, a method of fabricating the same, and a method of sensing strain (1200). The method of strain sensing comprises providing an optical fiber having at least a first fiber Bragg grating (FBG) and a second FBG formed therein (1202); subjecting the optical fiber to a strain inducing force such that a grating period in the first FBG compresses and a grating period in the second FBG extends (1204); and optically interrogating the first and second FBG to determine peak reflection wavelengths of the first and second FBGs respectively (1206), whereby a separation between the peak reflection wavelengths of the first and second FBGs is representative of the strain induced.

20 Claims, 7 Drawing Sheets

FOREIGN PATENT DOCUMENTS

| WO | 2004/104539 | 12/2004 |
|----|-------------|---------|
| WO | 2005/083379 | 9/2005  |

OTHER PUBLICATIONS

M. G. Xu et al., "Discrimination between strain and temperature effects using dual-wavelength fiber grating sensors," Electron Lett., vol. 31, No. 10, pp. 1085-1087, 1995.

M. G. Xu et al., "Temperature-independent strain sensor using a chirped Bragg grating in a tapered optical fiber," Electron Lett., vol. 31, No. 10, pp. 823-825, 1995.

V. Bhatia et al., "Simultaneous strain and temperature measurement with long- period gratings," Opt. Lett., vol. 22, No. 9, pp. 648-650, 1997.

S. W. James et al., "Simultaneous independent temperature and strain measurement using in-fiber Bragg grating sensors," Electron Lett., vol. 32, No. 12, pp. 1133-1134, 1996.

M. Song et al., "Simultaneous measurement of temperature and strain using two fiber Bragg gratings enbedded in a glass tube," Opt. Fiber Technol., vol. 3, No. 2, pp. 194-196, 1997.

D. A. Jackson et al., Simple multiplexing scheme for a fiber-optic grating sensor network, Opt. Lett., vol. 18, No. 14, pp. 1192-1194, 1993.

A. D. Kersey et al., "Multiplexed fiber Bragg grating strain-sensor system with a fiber Fabry-Perot wavelength filter," Opt. Lett., vol. 18, No. 16, pp. 1370-1372, 1993.

G. W. Yoffe et al., "Passive temperature-compensating package for optical fiber grating," Applied Optics, vol. 34, No. 30, pp. 6859-6861, Oct. 20, 1995.

* cited by examiner

FIBER BRAGG GRATING SENSOR

FIELD OF THE INVENTION

The present invention relates broadly to an optical fiber strain sensor, a method of fabricating the same, and a method of sensing strain.

BACKGROUND

Many techniques to discriminate the effects between strain and temperature in fiber Bragg grating (FBG) sensors have been reported, which include schemes using a tilted fiber Bragg grating demodulator [Sung Chul Kang, Se Yoon Kim etl, "Temperature-independent strain sensor system using a tilted fiber Bragg grating demodulator," IEEE Photon. Technol. Lett., vol. 10, No 10, October 1998], superimposed gratings [M. G. Xu, J. L Archambault, L. Reekie, and J. P. Dakin, "Discrimination between strain and temperature effects using dual-wavelength fiber grating sensors," Electron. Lett., vol. 30, no. 13, pp. 1085-1087, 1994], a chirped Bragg grating [M. G. Xu, L. Dong, L. Reekie, J. A. Tucknott, and J. L. Cruz, "Temperature-independent strain sensor using a chirped Bragg grating in a tapered optical fiber," Electron. Lett., vol. 31, no. 10, pp. 823-825, 1995] and a long period grating [V. Bhatia, D. Campbell, R. O. Claus, and A. M. Vengsarkar, "Simultaneous strain and temperature measurement with long-period gratings," Opt. Lett., vol. 22, no. 9, pp. 648-650, 1997], etc.

Among existing schemes, a dual head sensor is one of the most effective schemes due to its compact size and good performance [S. W. James, M. L. Dockney, and R. P. Tatam, "Simultaneous independent temperature and strain measurement using in-fiber Bragg grating sensors," Electron. Lett., vol. 32, no. 12, pp. 1133-1134, 1996] [M. Song, S. B. Lee, S. S. Choi, and B. Lee, "Simultaneous measurement of temperature and strain using two fiber Bragg gratings embedded in a glass tube," Opt. Fiber Technol., vol. 3, no. 2, pp. 194-196, 1997]. However, those known techniques are more research-based, and none of those techniques provide proper packaging methods that can cater for real applications. Although the techniques using an FBG [D. A. Jackson, A. B. Lobo Ribeiro, L. Reekie, and J. L. Archambault, "Simple multiplexing scheme for a fiber-optic grating sensor network," Opt. Lett., vol. 18, no. 14, pp. 1192-1194, 1993] or a fiber Fabry-Perot wavelength filter [A. D. Kersey, T. A. Berkoff, and W. W. Morey, "Multiplexed fiber Bragg grating strain-sensor system with a fiber Fabry-Perot wavelength filter," Opt. Lett., vol. 18, no. 16, pp. 1370-1372, 1993] as a demodulator have shown good results, they need a complete temperature-isolation of the demodulating FBG or a sophisticated calibration in fabricating the filter, respectively.

Various methods have been devised for achieving temperature independence for the wavelengths of FBGs. These methods include active systems that utilize feedback to monitor and dynamically control certain parameters, and passive devices that utilize the thermal characteristics of materials/structures to modify the response of the FBG wavelength to temperature. Passive devices are more desirable since they are much simpler and no power source and so are generally maintenance-free. The wavelength of an FBG is determined by the refractive index of the fiber and the period of the grating, both of which change with temperature. Since the refractive index is hard to control, passive temperature compensation devices generally operate by controlling the elongation with temperature of the optical fiber containing the FBG.

The control is usually accomplished by embedding the fiber containing the FBG into a mechanical structure, which is designed to release tension applied to the fiber with increasing temperature. G. W. Yoffe et al [G. W. Yoffe, Peter A. Krug, F. Ouellette, and D. A. Thomcraft, "Passive temperature-compensating package for optical fiber grating," Applied Optics, Vol. 34, No. 30, 20 Oct. 1995] has proposed a passive temperature compensating package for an optical fiber grating, in which the grating is mounted under tension in a package comprising two materials (a silica tube and an aluminum tube) with different thermal-expansion coefficients (TEC). As the temperature rises, the strain is progressively released, compensating the temperature dependence of the Bragg wavelength. A wavelength shift of 0.7 pm/° C. was achieved, but the overall structure requires precision-made components and is complicated to assemble. Another complicated design based on a similar principle to offer temperature compensation over a wider temperature range has been patented by Lin et al., "Temperature-compensating device with tunable mechanism for optical fiber gratings," (U.S. Pat. No. 6,374, 015, 2002).

In contrast to the electrical strain sensors, optical fiber sensors have many advantages from the viewpoint of the principle such as small size and robustness, immunity to EMI and RFI (Radio Frequency Interference), inherent safety (explosion-proof) and accuracy. However, there remain the above mentioned problems to be overcome in the development of optical fiber sensors.

A need therefore exists to provide an optical fiber sensor that seeks to address at least one of the above mentioned problems.

SUMMARY

In accordance with a first aspect of the present invention there is provided a method of strain sensing comprising the steps of providing an optical fiber having at least a first fiber Bragg grating (FBG) and a second FBG formed therein; subjecting the optical fiber to a strain inducing force such that a grating period in the first FBG compresses and a grating period in the second FBG extends; and optically interrogating the first and second FBG to determine peak reflection wavelengths of the first and second FBGs respectively; whereby a separation between the peak reflection wavelengths of the first and second FBGs is representative of the strain induced.

The first and second FBGs, in a quiescent state, may have different grating periods for providing an initial separation of the peak reflection wavelengths of the first and second FBGs.

The optical fiber may be embedded in a packaging structure such that the first and second FGBs are disposed on opposite sides of a strain neutral layer of the packaging structure.

The packaging structure may have substantially an arc-shape, and the strain inducing force is applied substantially at an apex of the arc-shaped packaging structure.

The method may comprise providing an optical fiber having a plurality of pair of first and second FBGs formed therein and spaced apart along a length of the optical fiber, subjecting the optical fiber to a plurality of strain inducing forces such that, for each pair of first and second FBGs, grating periods in the first FBG compresses and a grating period in the second FBG extends; and optically interrogating the respective pairs of first and second FBGs to determine peak reflection wavelengths of the first and second FBGs respectively; whereby separations between the peak reflection wavelengths of the first and second FBGs respectively for respective pairs of first and second FBGs are representative of the respective strains induced.

In accordance with a second aspect of the present invention there is provided an optical fiber strain sensor comprising an optical fiber; at least a first fiber Bragg grating (FBG) and a second FBG formed in the optical fiber, a packaging structure embedding the optical fiber such that if the optical fiber is subjected to a strain inducing force, a grating period in the first FBG compresses and a grating period in the second FBG extends; and an interrogation system for optically interrogating the first and second FBGs to determine peak reflection wavelengths of the first and second FBGs respectively; whereby a separation between the peak reflection wavelengths of the first and second FBGs is representative of the strain induced.

The first and second FBGs, in a quiescent state, may have different grating periods for providing an initial separation of the peak reflection wavelength of the first and second FBGs.

The optical fiber may be embedded in the packaging structure such that the first and second FBGs are disposed on opposite sides of a strain neutral layer of the packaging structure.

The packaging structure may have substantially an arc-shape, and the strain inducing force is applied substantially at an apex of the arc-shaped packaging structure.

The packaging structure may comprise a composite laminate structure.

The composite laminate structure may comprise fiber-reinforced carbon composite material prepregs.

The first and second FBGs may be aligned with each other within the composite structure, and the composite laminate structure is symmetric with respect to the FBGs.

The optical fiber may have a plurality of pair of first and second FBGs formed therein and spaced apart along a length of the optical fiber; the packaging structure embeds the pairs of first and second FBGs such that, if the optical fiber is subjected to a plurality of strain inducing force, for each pair of first and second FBGs, grating periods in the first FBG compresses and a grating period in the second FBG extends; and the interrogation system optically interrogates the respective pairs of first and second FBGs to determine peak reflection wavelengths of the first and second FBGs respectively; whereby separations between the peak reflection wavelengths of the first and second FBGs respectively for respective pairs of first and second FBGs are representative of the respective strains induced.

In accordance with a third aspect of the present invention there is provided a method of fabricating an optical fiber strain sensor, the method comprising the steps of providing an optical fiber; forming at least a first fiber Bragg grating (FBG) and a second FBGs in the optical fiber; embedding the optical fiber in a packaging structure such that, if the optical fiber is subjected to a strain inducing force, a grating period in the first FBG compresses and a grating period in the second FBG extends.

The method may further comprise coupling an interrogation system to the optical fiber for optically interrogating the first and second FBGs to determine peak reflection wavelengths of the first and second FBGs respectively; whereby a separation between the peak reflection wavelengths of the first and second FBGs is representative of the strain induced.

The first and second FBGs, in a quiescent state, may have different grating periods for providing an initial separation of the peak reflection wavelength of the first and second FBGs.

The optical fiber may be embedded in the packaging structure such that the first and second FGBs are disposed on opposite sides of a strain neutral layer of the packaging structure.

The packaging structure may have substantially an arc-shape, and the strain inducing force is applied substantially at an apex of the arc-shaped packaging structure.

The packaging structure may comprise a composite laminate structure.

The composite laminate structure may comprise fiber-reinforced carbon composite material prepregs.

The FBGs may be aligned with each other within the composite structure, and the composite laminate structure is symmetric with respect to the FBGs.

The method may comprise forming a plurality of pair of first and second FBGs in the optical fiber and spaced apart along a length of the optical fiber; and embedding the pairs of first and second FBGs in the packaging structure such that, if the optical fiber is subjected to a plurality of strain inducing force, for each pair of first and second FBGs, grating periods in the first FBG compresses and a grating period in the second FBG extends.

The interrogation system may optically interrogate the respective pairs of first and second FBGs to determine peak reflection wavelengths of the first and second FBGs respectively; whereby separations between the peak reflection wavelengths of the first and second FBGs respectively for respective pairs of first and second FBGs are representative of the respective strains induced.

DETAILED DESCRIPTION

An optical fiber sensor module is described in which FBGs are made using normal single mode fiber (SMF), and only one low-cost material (such as fiber-reinforced composite) is required for the sensor packaging. An arc-shaped symmetrical structure with a pair of FBGs embedded within make the sensor module very simple, compact, robust and low cost. Furthermore, the sensor module provides a high sensitivity, repeatability and accuracy to the applied pressure/load/displacement. The sensor module also provides design flexibility because the sensitivity and sensing range can be tailored according to actual requirements. The sensor module is applicable for the usage in practical sensor networks and smart structures.

Figure 1:
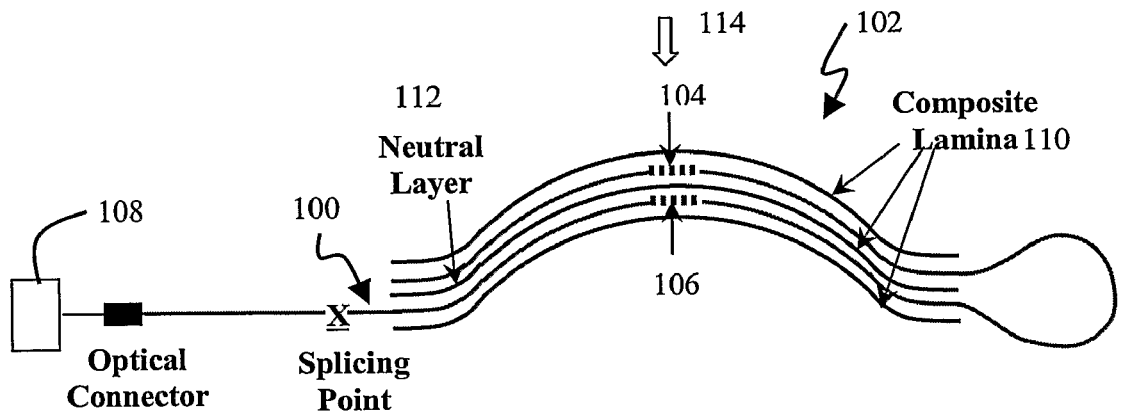
FIG. 1 shows a schematic diagram of an embedding structure of an optical fiber sensor module.

With reference to FIG. 1, a standard telecommunication grade single-mode optical fiber 100 with a 250-micron acrylate coating (ITU-T G.652) is used for FBG fabrication. The fiber 100 is hydrogen loaded to increase the photosensitivity. The sensor module 102 consists of a pair of FBGs 104, 106. Prior to assembly of the sensor module 102 the acrylate coating of two short sections (about 10~20 mm) of the fiber 100 are mechanically stripped off at pre-defined positions, and the two FBGs 104, 106 are written into the stripped sections using a standard phase mask exposure technique. The same phase mask is used to inscribe the two FBGs 104, 106. Grating 106 is written when the stripped section is unstrained. The other stripped section is pre-tensioned to 180 micro-strain during exposure so that the grating 104 can have a blue shift of about 0.2 nm after the tension is released. Blackmann-Harris apodisation is applied during grating writing to further improve the Gaussian profile of the reflection spectrum and suppress the formation of side-lobes.

Each grating 104, 106 is about 5-10 mm long and is located at the center of the stripped area. The number of FBGs along a single optical fiber may vary and may be over ten, provided the initial wavelength allocation of each FBG sensor pair does not overlap with that of the adjacent sensor pair. The number of sensors depends on the sensitivity and the sensing range required by a particular application. The number is also dependent by the bandwidth and the power budget of the interrogation system.

After FBG fabrication, the optical fiber 100 is put into oven for annealing (100° C. for 24 hours) to stabilize the Bragg wavelength.

The composite-laminated arc-shaped fiber Bragg grating (FBG) sensor module 102, which comprises of the two FBGs 104, 106 with an initial peak-wavelength-separation of about 0.2 nm, is coupled to an FBG interrogation system 108. The two FBGs 104, 106 are embedded symmetrically in a packaging structure in the form of a reinforced composite laminate 110, and mm parallel to the reinforced fibers of the composite. FBG 104 with the shorter peak wavelength is embedded above a neutral layer 112, and FBG 106 with the longer peak wavelength is embedded below the neutral layer 112. When there is a pressure/load/displacement 114 applied to the sensor module 102, FBG 106 is under tension and the grating period of FBG 106 increases, which results in a red shift of the reflected spectrum of the FBG 106. At the same time, FBG 104 is under compression and the grating period of FBG 104 decreases which causes a blue shift of the reflected spectrum of the FBG 104. As a result, the two peak wavelengths move apart from each other with the applied pressure/load/displacement 114 in a linear manner.

It is noted that the above described behavior is not dependent on the arc-shape of the sensor module. A similar behavior can also be achieved with other shapes, including 3-point bending or 4-point bending structured composite laminates.

However, due to the symmetric positioning of the FBG pair, both FBG 104 and 106 move linearly towards the same direction at a same rate when their surrounding temperature varies. Therefore, by subtracting the two peak-wavelengths, the component of temperature-induced wavelength shifts can be simply removed, thus an accurate pressure/load/displacement reading can be easily obtained through experimental calibration on the module 102.

Due to the fact that the sensor module 102 consists of two FBGs 104, 106 and an elastic material, here in the form of composite laminate 110, which are purely passive components, the temperature effect of the sensor 102 can be self-compensated without a need of any active temperature controller or other temperature-isolation mechanism. The sensitivity and sensing range can be adjusted by selection of different packaging material with respective Youngs modulus, or manipulating the packaging structure such as changing the thickness (or number of layers), or the size or the radius of the arc-shaped laminate 110.

In the following, a fabrication process for the sensor 102 will be described in detail. The single-mode photosensitive fiber 100 can e.g. be a Boron-doped or a Germanium-doped or a Boron-Germanium co-doped optical fiber. The photosensitive fiber 100 can also be realised by a hydrogen loading method—e.g. to place a normal Telecommunication grade single-mode optical fiber with a 250-micron acrylate coating (ITU-T G.652) into a hydrogen tank with a specified pressure (e.g. 100 bar) and temperature (e.g. 60° C.) for a few days (e.g. one week), which can increase the photosensitivity of the fiber.

Figure 2:
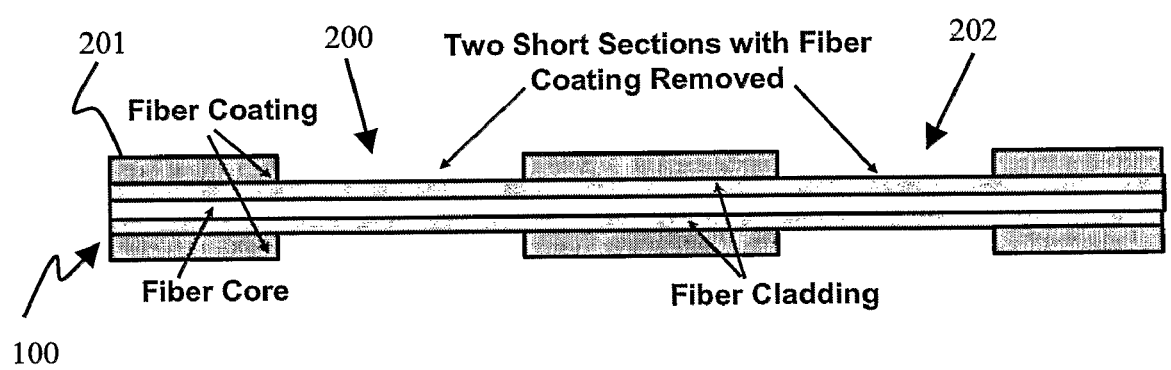
FIG. 2 is a schematic cross sectional view of an optical fiber for used in the sensor module of FIG. 1.

With reference to FIG. 2, the acrylate coating 201 of two short sections 200, 202 (about 10~20 mm or any desired length) of the fiber 100 are mechanically stripped off at predetermined locations.

Figure 3:
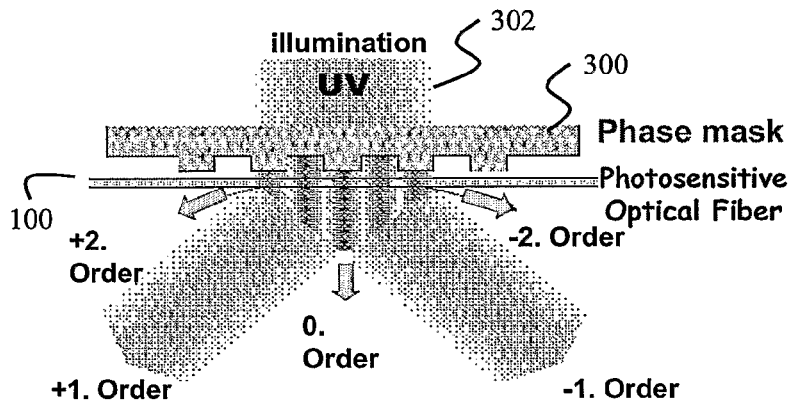
FIG. 3 is a schematic cross sectional view of a phase mask exposure technique for forming gratings in the optical fiber of FIG. 2.

The two FBGs 104, 106 (FIG. 1) are written into the stripped sections 200, 202 (FIG. 2) using a standard phase mask 300 exposure technique, as shown in FIG. 3. The UV laser beam 302 can be e.g. from a KrF Excimer laser (248 nm) or frequency doubled Argon laser (244 nm).

Figure 4:
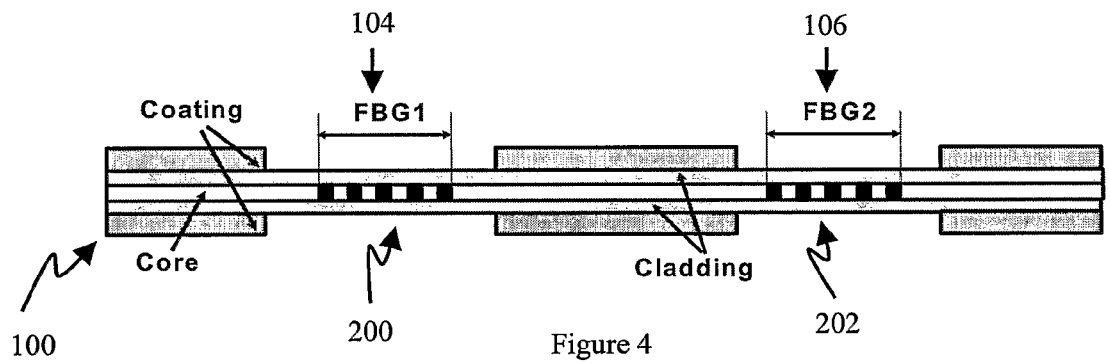
FIG. 4 is a schematic cross sectional view of the optical fiber of FIG. 2 after forming the gratings.

With reference to FIG. 4, the same phase mask is used to inscribe the two FBGs 104, 106. FBG 106 is written when the stripped section 200 is unstrained. The other stripped section 202 is pre-tensioned to 180 micro-strain during exposure so that the FBG 104 has a blue shift of about 0.2 nm after the tension is released. Blackmann-Harris apodisation is applied during the grating writing to further improve the Gaussian profile of the reflection spectrum and suppress the formation of side-lobes.

Figure 5:
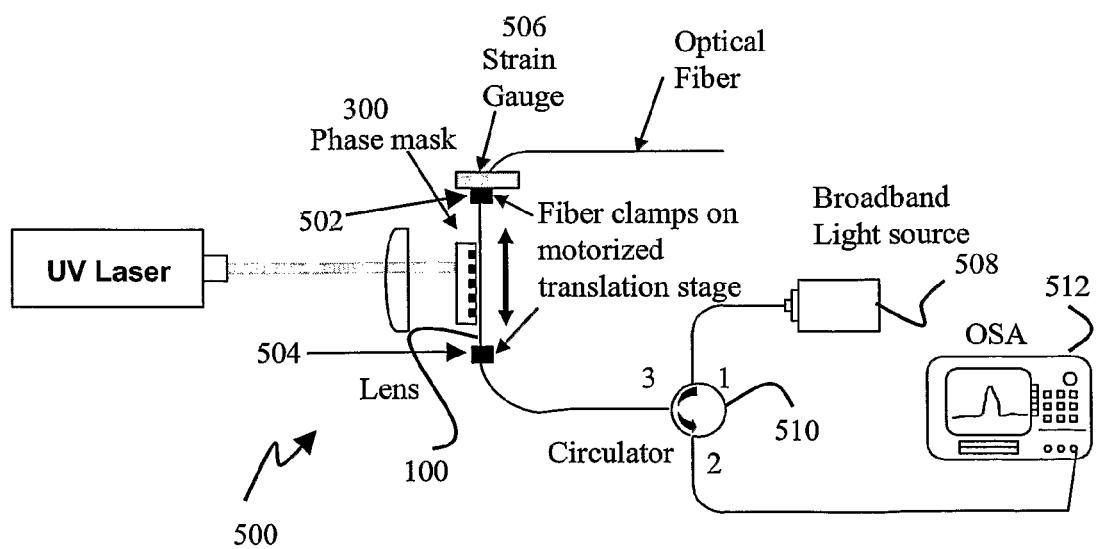
FIG. 5 shows a schematic diagram of an FBG fabrication platform for writing the gratings into the optical fiber of FIG. 2.

FIG. 5 shows the FBG fabrication platform 500. The length of the FBG can be fabricated from a few millimeters to a few tens of centimeters. The technique is based on the principle of writing a subgrating per irradiation step. The W-footprint creating this subgrating is accomplished by the phase mask 300. The fiber 100 with coating removed area is clamped on the two fiber clamps 502, 504 that are fixed on a motorised translation stage not shown. A strain gauge 506 is placed next to one of the fiber clamps 502 to monitor the tensile strain of the fiber 100 on the clamp 502 before starting UV inscription. During UV inscription, the fiber 100 is translated with constant speed relative to the UV-fringes with the interferometer controlled translation stage. The position is very accurately tracked during the motion and this data is used to trigger the W laser when the fiber reaches the desired position for the next irradiation. By sequentially writing subgratings and varying the phase between different sets of subgratings, an ultra-long FBG with almost arbitrary profiles can be produced. For the sensor module 102 (FIG. 1), uniform gratings are used. The reflection spectrum of the FBG is constantly monitored during UV inscription using a Broadband Light source 508, Optical circulator 510 and an Optical Spectrum Analyzer 512 (OSA).

After writing the FBGs, the fiber is put into an oven for annealing (100° C. for 24 hours) to stabilize the Bragg wavelength of both FBGs.

Fiber Reinforced Composite (FRC) material is chosen for embedding the FBG sensor due to a high strength-to-weight ratio, corrosion resistance, high elasticity and excellent linear force translation, low electro-magnetic interference and mold ability into complex shapes. FRC lamina (prepreg) refers to a thin layer of material composed of reinforcing fibers surrounded by a matrix (such as epoxy). FRC laminate refers to a stack of such lamina bonded together with the individual lamina/prepreg oriented in certain directions.

Figure 6:
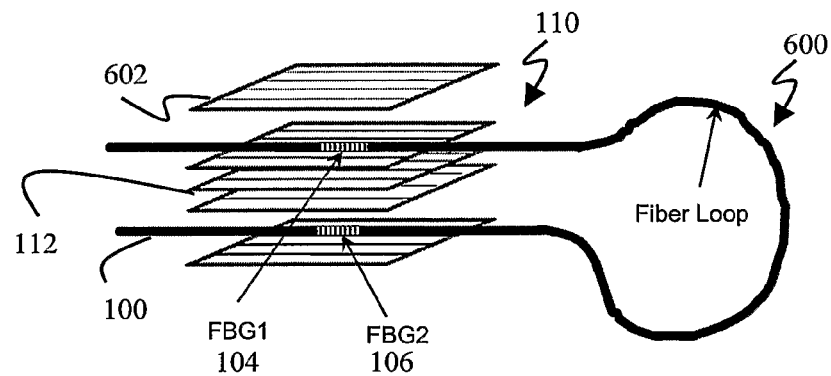
FIG. 6 is a schematic exploded perspective view of the sensor module of FIG. 1.
Figure 7:
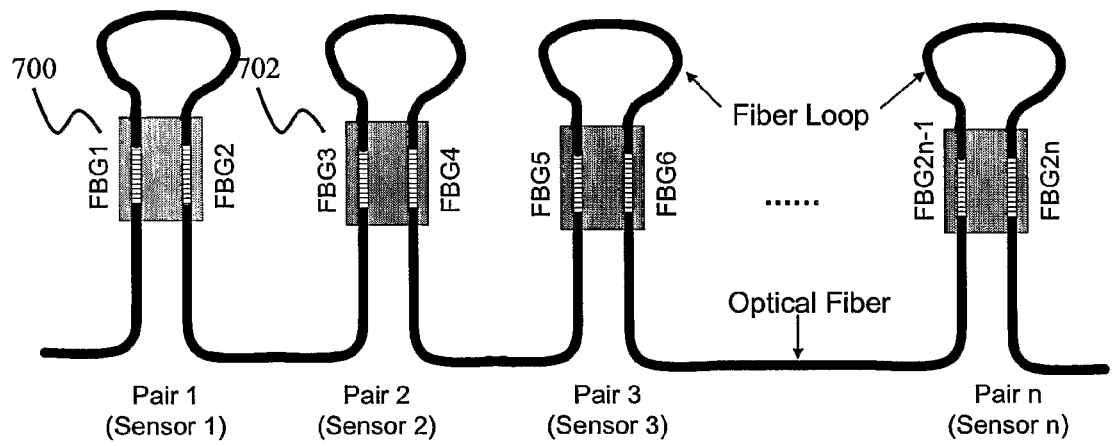
FIGS. 7a) and b) are schematic drawings of a multi-sensor arrangements.
Figure 7:
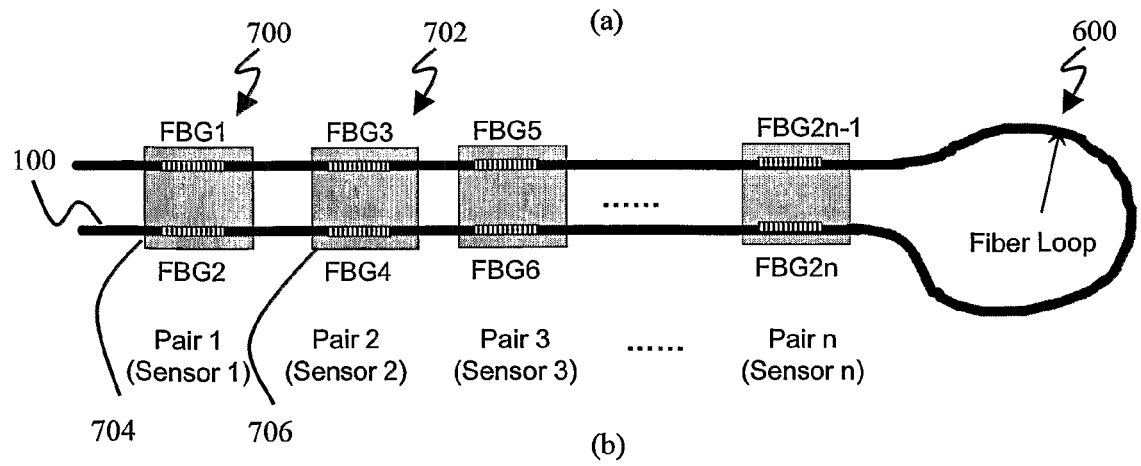

With reference to FIG. 6, the two FBGs 104, 106 are embedded symmetrically in the FRC laminate 110, with both FGBs 104, 106 running parallel to the reinforced fibers of the FRC lamina 110, to form a uni-plied laminate. FBG 104 with the shorter peak wavelength is embedded above the neutral layer 112, and FBG 106 with longer peak wavelength is embedded below the neutral layer 112. The two FBGs 104, 106 are located along the same fiber 100 with a small fiber loop 600 lying outside the laminate 110. The loop structure 600 allows for the multiplexing of many pairs e.g. 700, 702 of FBGs cascaded in series for example configurations as shown in FIGS. 7*a*) and *b*). Each pair e.g. 700, 702 of FBGs can be fabricated using the same phase mask but different tension on the fiber during FBG fabrication. Each FBG pair is packaged within one respective module e.g. 704, 706. Different modules e.g. 704, 708 can be located at any desired location along the fiber 100.

Returning to FIG. 6, the prepregs e.g. 602 are first removed from the freezer and allowed to thaw overnight before cutting them to the required sizes. The prepregs e.g. 602 are then cut with a penknife at different direction such as 0°, 90°, +45° and −45° with respect to the direction of the optical fiber. To prevent water contamination and other contaminants from settling on the prepregs e.g. 602, the non-adhesive films (not shown) on the prepregs e.g. 602 are not removed during cutting.

Figure 8:
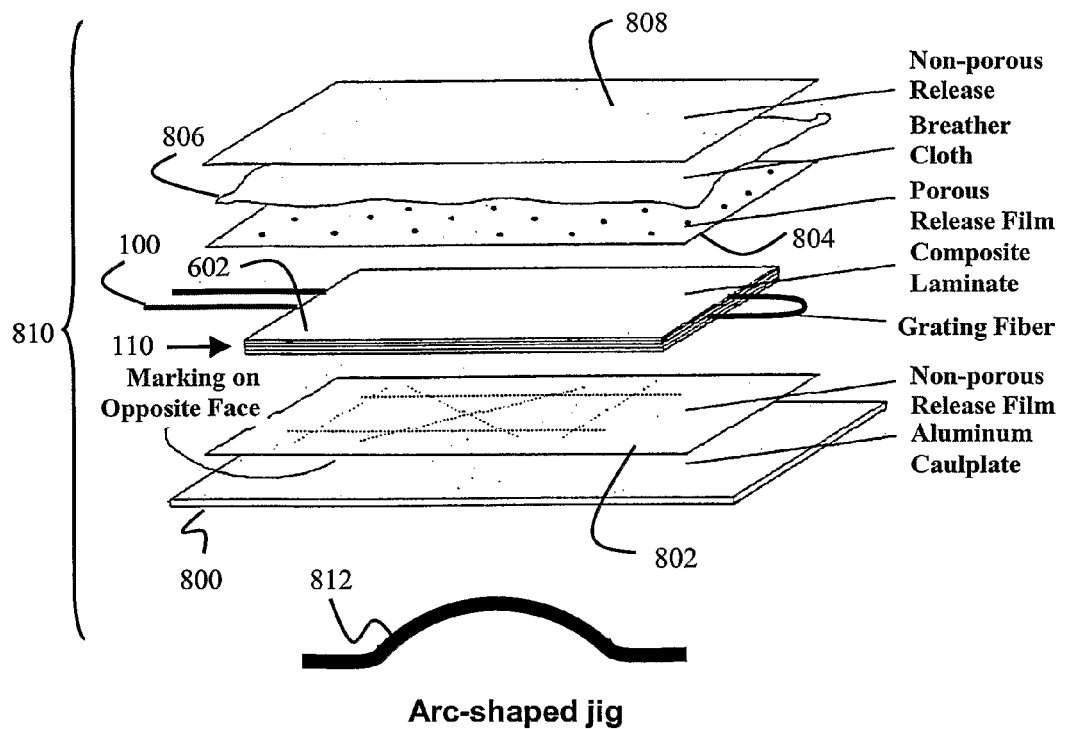
FIG. 8 is a schematic exploded perspective view illustrating fabrication of a sensor module.

With reference to FIG. 8, an aluminum caulplate 800 is used as the base for the lay-up. The caulplate 800 is wrapped with a layer of release fabric Teflon coated fiber glass or non-porous release film 802 (Release Ease 234 TFNP) that has been cleaned with acetone to remove any contaminants that might affect the surface quality of the cured laminates before laying the carbon fiber prepregs.

The composite laminates 110 is prepared by layering the prepregs e.g. 602 onto the non-porous release film 802 on the caulplate 800 using a manual lay-up method. At this stage, the grating fiber 100 containing the two FBGs is introduced to the prepregs e.g. 602 with the grating fiber 100 running parallel to the reinforced fiber of each. A roller is used to even out the surface to achieve even placement between plies. The completed laminate 110 is covered with a layer of release fabric Teflon coated fiberglass or porous release film 804 (Release Ease 234 TFP), followed by a breather cloth 806 (Airwaves Super 10) to absorb the excess resin. Finally, a layer of non-porous release film 808 is placed on top of the breather cloth 806 before the whole set-up 810 is transferred to a composite-curing table (e.g. Heatcon 9500) or a vacuum oven (e.g. Salvis Lab Vacuum Oven Vacucenter VC-20).

With an initial temperature of 24° C., the temperature is ramped to 120° C. at a rate of 2° C./min, and curing performed for 60 minutes at 120° C. After cool down, the composite laminated sensor module is removed from the curing table or oven.

In the case of arc-shaped sensor module 102 (FIG. 1) preparation, an arc-shaped jig 812 is used as the base for the lay-up, which is placed in between the non-porous release film 802 and aluminum caulplate 800. The rest of the embedding procedures are the same as mentioned above.

Figure 9:
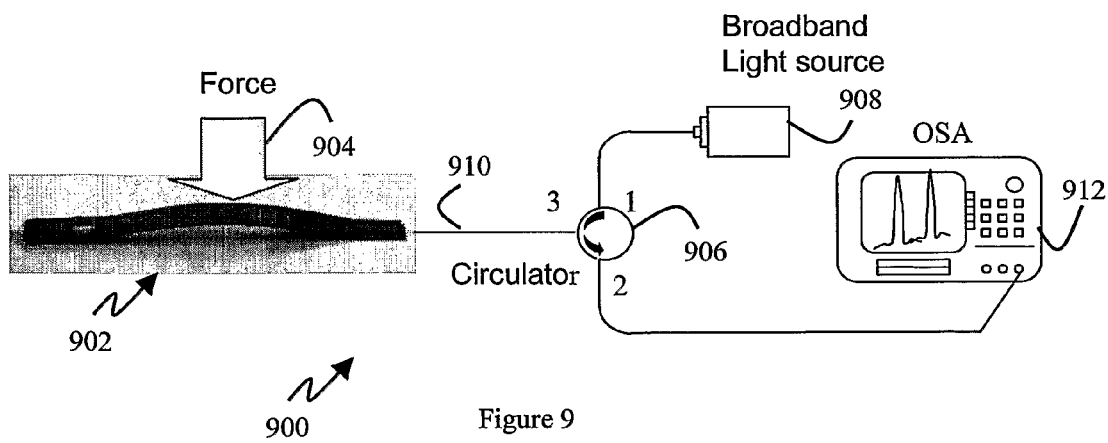
FIG. 9 shows a schematic diagram of a reflection spectrum measurement set-up.

FIG. 9 shows a reflection Spectrum Measurement set-up 900 to observe the peak wavelength separation of the two FBGs in a sensor module 902 versus displacement while a laterally force 904 is applied. A circulator 906 is utilised to couple a light signal from a broadband light source 908 into the optical fiber 910 of the sensor module 902. The reflected light signal from the two FBGs in the sensor module 902 propagating along the same optical fiber 910 of the sensor module 902 is directed to an OSA 912 via the circulator 906 for the peak wavelength measurements.

Figure 10:
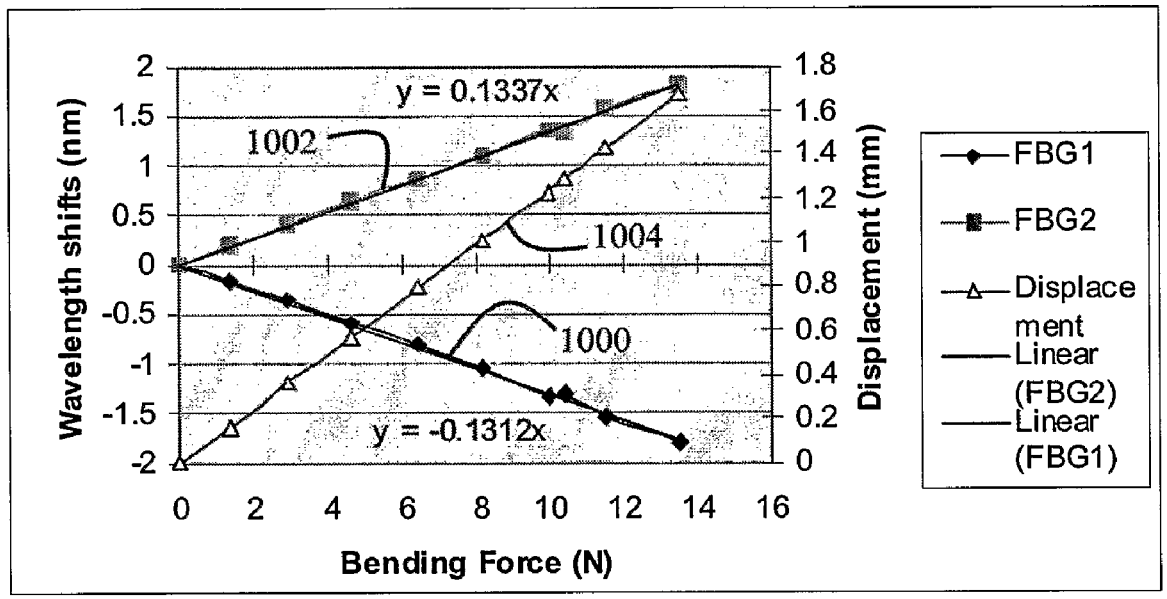
FIG. 10 is a graph showing wavelength shifts and displacement as a function of bending force for the sensor module of FIG. 1.

Under load test, the FBG above the neutral layer (curve 1000) shows a blue shift of wavelength, while the FBG below the neutral layer (curve 1002) shows red shift a of wavelength, as shown in FIG. 10. Both, wavelength shifts versus bending force (curve 1000, 1002) and Displacement versus bending force (curve 1004) show good linearity.

Figure 11:
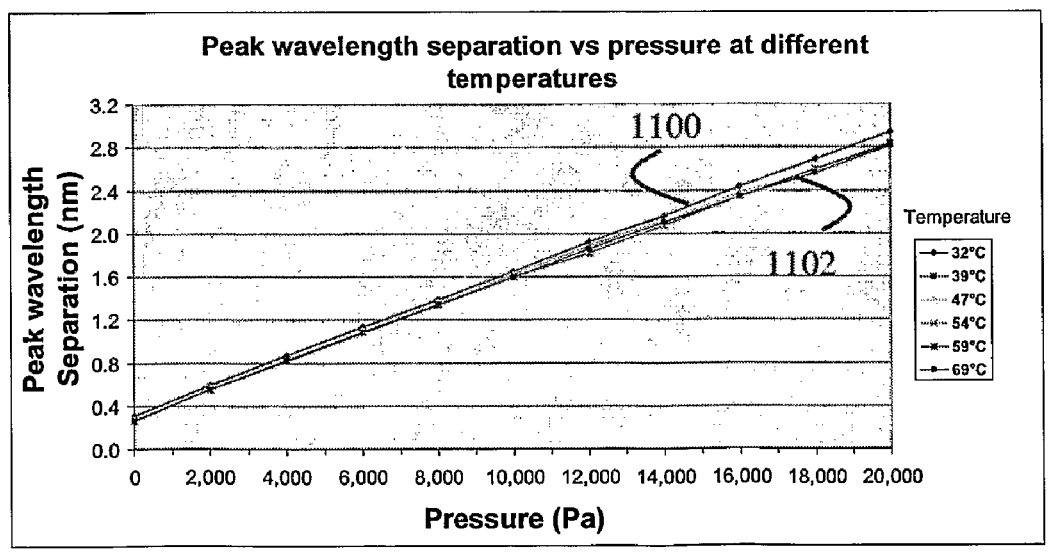
FIG. 11 shows a graph of peak wavelength separation as a function of pressure for the sensor module of FIG. 1 for different temperatures.

To test out the temperature dependency, the sensor is placed in an oven, at various temperature points, and the wavelength separation of the two FBGs versus lateral applied force/pressure to the specimen measured. The results show that the Peak wavelength separation of the two FBGs is linearly proportional to the applied pressure/load/displacement (compare e.g. curves 1100, 1102) with almost same gradient a cross a temperature range from 32° C. to 69° C., as shown in FIG. 11. These experimental results show that by subtracting the two peak-wavelengths, the component of temperature-induced wavelength shifts can be simply removed, thus an accurate pressure/load/displacement reading can be easily obtained by experimental calibration on the module.

Figure 12:
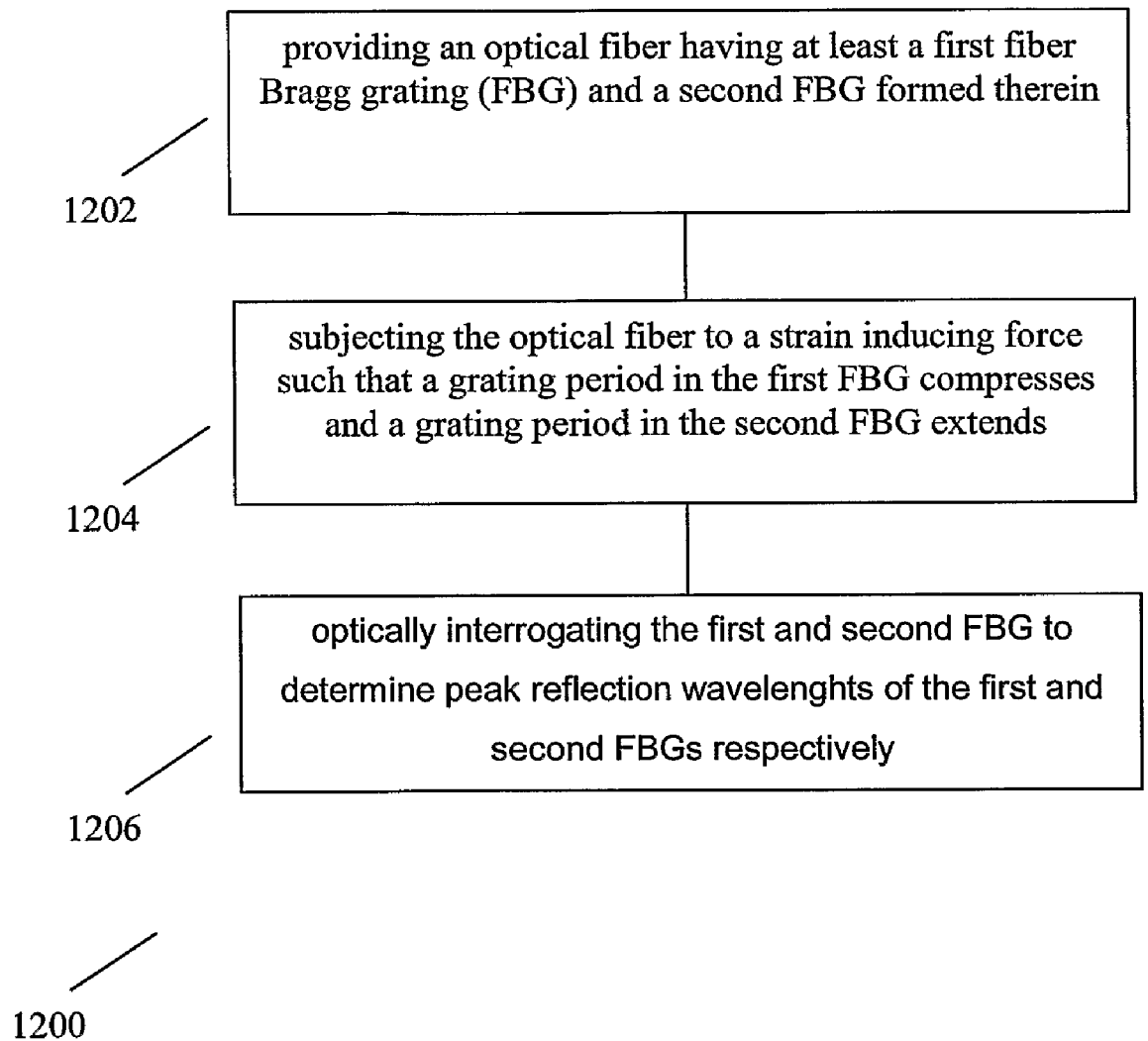
FIG. 12 shows a flowchart Illustrating a method of strain sensing.

FIG. 12 shows a flowchart 1200 illustrating a method of strain sensing. At step 1202, an optical fiber having at least a first fiber Bragg grating (FBG) and a second FBG formed therein is provided. At step 1204, the optical fiber is subjected to a strain inducing force such that a grating period in the first FBG compresses and a grating period in the second FBG extends. At step 1206, the first and second FBG are optically interrogated to determine peak reflection wavelengths of the first and second FBGs respectively whereby a separation between the peak reflection wavelengths of the first and second FBGs is representative of the strain induced.

Figure 13:
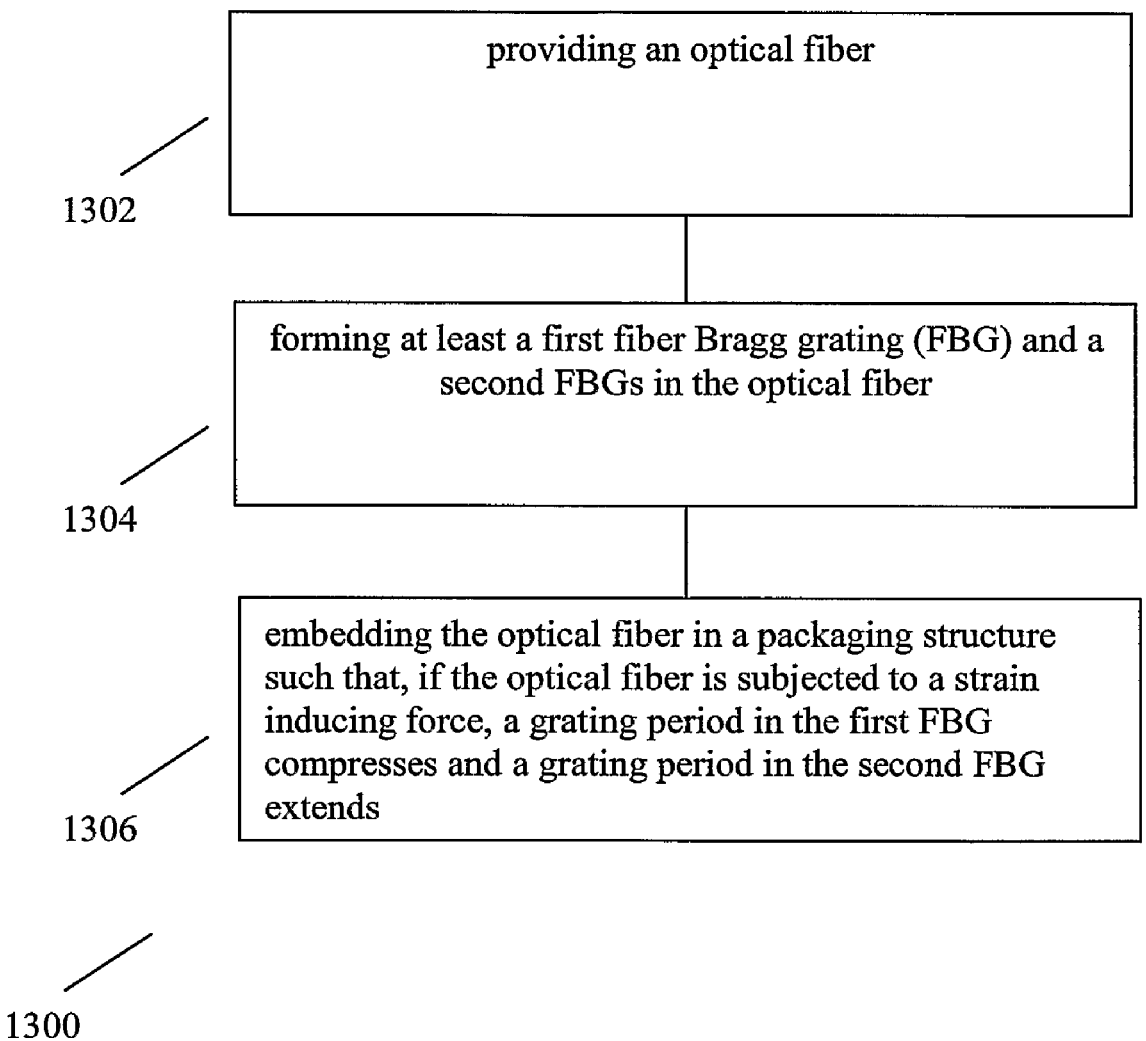
FIG. 13 is a flowchart illustrating a method of fabricating an optical fiber strain sensor.

FIG. 13 shows a flowchart 1300 illustrating a method of fabricating an optical fiber strain sensor. At step 1302, an optical fiber is provided. At step 1304, at least a first fiber Bragg grating (FBG) and a second FBGs in the optical fiber are formed in the optical fiber. At step 1308, the optical fiber is embedded in a packaging structure such that, if the optical fiber is subjected to a strain inducing force, a grating period in the first FBG compresses and a grating period in the second FBG extends.

The described sensor modules can provide stable strain measurement independent of temperature perturbation of the sensor without additional temperature-isolation or temperature referencing process and showed a minimum resolvable strain of less than 1 με. Due to the all-passive and simple mechanism, low-cost, robustness, high sensitivity, reliability and durability, the sensor modules can be widely used for pressure/load/displacement sensing in e.g. boilers, chemical process reactors, engines, and the human bodies to smart structures. Industrial application includes pressure monitoring for aero-planes and sleep monitoring to categorize spatial-temporal pressure patterns into pre-defined sleeping states.

The described sensor modules can provide the following advantages:
Extremely sensitive with large dynamic range
Multiple sensors can be embedded within single fiber strand and arranged to any desired spatial configuration
Scalability of deployment for large number of sensors
Low attenuation of fibers meant the application site could be very far away from monitoring station: flexibility in deployment
Different sensor packaging enables customisation of required sensitivity
Unique demodulation approach reduces number of components and overall cost

What is claimed is:

1. A method of strain sensing comprising the steps of:
providing an optical fiber having at least a first fiber Bragg grating (FBG) and a second FBG formed therein;
providing a packaging structure having, in a quiescent state, substantially an arc-shape such that the first FBG is disposed on an outer side of an apex of the arc-shaped packaging structure, and the second FBG is disposed on an inner side of the apex;
subjecting the optical fiber to a strain inducing force that is applied substantially at the apex of the arc-shaped packaging structure such that a grating period in the first FBG compresses and a grating period in the second FBG extends; and
optically interrogating the first and second FBGs to determine peak reflection wavelengths of the first and second FBGs respectively;
wherein the first and second FBGs, in the quiescent state, have different grating periods for providing an initial separation of the peak reflection wavelengths of the first and second FBGs and such that a grating period of the first FBG is shorter than a grating period of the second FBG,
whereby a separation between the peak reflection wavelengths of the first and second FBGs is representative of the strain induced.

2. The method as claimed in claim 1, wherein the strain inducing force is perpendicular with respect to the first and second FBGs.

3. The method as claimed in claim 1, wherein the optical fiber is embedded in the packaging structure such that the first and second FBGs are disposed on opposite sides of a strain neutral layer of the packaging structure.

4. The method as claimed in claim 1, further comprising:
providing the optical fiber having a plurality of pairs of first and second FBGs formed therein and spaced apart along a length of the optical fiber;
subjecting the optical fiber to a plurality of strain inducing forces such that, for each pair of first and second FBGs, the grating period in the first FBG compresses and the grating period in the second FBG extends; and
optically interrogating the respective pairs of first and second FBGs to determine peak reflection wavelengths of the first and second FBGs respectively;
whereby separations between the peak reflection wavelengths of the first and second FBGs respectively for the respective pairs of first and second FBGs are representative of the respective strains induced.

5. An optical fiber strain sensor comprising:
an optical fiber;
at least a first fiber Bragg grating (FBG) and a second FBG formed in the optical fiber;
a packaging structure embedding the optical fiber such that if the optical fiber is subjected to a strain inducing force, a grating period in the first FBG compresses and a grating period in the second FBG extends, wherein the packaging structure has, in a quiescent state, substantially an arc-shape such that the first FBG is disposed on an outer side of an apex of the arc-shaped packaging structure, the second FBG is disposed on an inner side of the apex, and the strain inducing force is applied substantially at the apex of the arc-shaped packaging structure; and
an interrogation system for optically interrogating the first and second FBGs to determine peak reflection wavelengths of the first and second FBGs respectively;
wherein the first and second FBGs, in the quiescent state, have different grating periods for providing an initial separation of the peak reflection wavelengths of the first and second FBGs and such that a grating period of the first FBG is shorter than a grating period of the second FBG,
whereby a separation between the peak reflection wavelengths of the first and second FBGs is representative of the strain induced.

6. The sensor as claimed in claim 5, wherein the strain inducing force is perpendicular with respect to the first and second FBGs.

7. The sensor as claimed in claim 5, wherein the optical fiber is embedded in the packaging structure such that the first and second FBGs are disposed on opposite sides of a strain neutral layer of the packaging structure.

8. The sensor as claimed in claim 5, wherein the packaging structure comprises a composite laminate structure.

9. The sensor as claimed in claim 8, wherein the composite laminate structure comprises fiber-reinforced carbon composite material prepregs.

10. The sensor as claimed in claim 8, wherein the first and second FBGs are aligned with each other within the composite laminate structure, and the composite laminate structure is symmetric with respect to the FBGs.

11. The sensor as claimed in claim 5, wherein:
the optical fiber has a plurality of pairs of first and second FBGs formed therein and spaced apart along a length of the optical fiber;
the packaging structure embeds the pairs of first and second FBGs such that, if the optical fiber is subjected to a plurality of strain inducing forces, for each pair of first and second FBGs, the grating period in the first FBG compresses and the grating period in the second FBG extends; and
the interrogation system optically interrogates the respective pairs of first and second FBGs to determine peak reflection wavelengths of the first and second FBGs respectively;
whereby separations between the peak reflection wavelengths of the first and second FBGs respectively for the respective pairs of first and second FBGs are representative of the respective strains induced.

12. A method of fabricating an optical fiber strain sensor, the method comprising the steps of:
providing an optical fiber;
forming at least a first fiber Bragg grating (FBG) and a second FBG in the optical fiber;
embedding the optical fiber in a packaging structure such that, if the optical fiber is subjected to a strain inducing force, a grating period in the first FBG compresses and a grating period in the second FBG extends;

wherein the first and second FBGs, in a quiescent state, have different grating periods for providing an initial separation of peak reflection wavelengths of the first and second FBGs and such that a grating period of the first FBG is shorter than a grating period of the second FBG, and wherein the packaging structure has, in the quiescent state, substantially an arc-shape such that the first FBG is disposed on an outer side of an apex of the arc-shaped packaging structure, the second FBG is disposed on an inner side of the apex, and the strain inducing force is applied substantially at the apex of the arc-shaped packaging structure.

13. The method as claimed in claim 12, further comprising coupling an interrogation system to the optical fiber for optically interrogating the first and second FBGs to determine the peak reflection wavelengths of the first and second FBGs respectively;

whereby a separation between the peak reflection wavelengths of the first and second FBGs is representative of the strain induced.

14. The method as claimed in claim 13, wherein the strain inducing force is perpendicular with respect to the first and second FBGs.

15. The method as claimed in claim 12, wherein the optical fiber is embedded in the packaging structure such that the first and second FBGs are disposed on opposite sides of a strain neutral layer of the packaging structure.

16. The method as claimed in claim 12, wherein the packaging structure comprises a composite laminate structure.

17. The method as claimed in claim 16, wherein the composite laminate structure comprises fiber-reinforced carbon composite material prepregs.

18. The method as claimed in claim 16, wherein the FBGs are aligned with each other within the composite laminate structure, and the composite laminate structure is symmetric with respect to the FBGs.

19. The method as claimed in claim 12, further comprising:
    forming a plurality of pairs of first and second FBGs in the optical fiber spaced apart along a length of the optical fiber; and
    embedding the pairs of first and second FBGs in the packaging structure such that, if the optical fiber is subjected to a plurality of strain inducing forces, for each pair of first and second FBGs, the grating period in the first FBG compresses and the grating period in the second FBG extends.

20. The method as claimed in claim 19, wherein the interrogation system optically interrogates respective pairs of first and second FBGs to determine the peak reflection wavelengths of the first and second FBGs respectively;
    whereby separations between the peak reflection wavelengths of the first and second FBGs respectively for the respective pairs of first and second FBGs are representative of the respective strains induced.

* * * * *